US012441335B2

(12) United States Patent
Lindenthal et al.

(10) Patent No.: US 12,441,335 B2
(45) Date of Patent: Oct. 14, 2025

(54) METHODS AND SYSTEMS FOR ESTIMATING VEHICLE LOAD AND TRAILER TONGUE LOAD BASED ON CAMERA IMAGES

(71) Applicant: GM GLOBAL TECHNOLOGY OPERATIONS LLC, Detroit, MI (US)

(72) Inventors: Steffen Peter Lindenthal, Oshawa (CA); Avesta Goodarzi, Whitby (CA); Utkarsh Saini, Pickering (CA)

(73) Assignee: GM GLOBAL TECHNOLOGY OPERATIOS LLC, Detroit, MI (US)

( * ) Notice: Subject to any disclaimer, the term of this patent is extended or adjusted under 35 U.S.C. 154(b) by 216 days.

(21) Appl. No.: 18/455,684

(22) Filed: Aug. 25, 2023

(65) Prior Publication Data

US 2025/0065888 A1    Feb. 27, 2025

(51) Int. Cl.
*B60W 40/13* (2012.01)
*G06V 20/56* (2022.01)

(52) U.S. Cl.
CPC ............ *B60W 40/13* (2013.01); *G06V 20/56* (2022.01); *B60W 2300/14* (2013.01); *B60W 2420/403* (2013.01); *B60W 2530/203* (2020.02)

(58) Field of Classification Search
CPC ............ B60W 40/13; B60W 2300/14; B60W 2420/403; B60W 2530/203; B60W 30/02; G06V 20/56

USPC .......................................................... 701/1
See application file for complete search history.

(56) References Cited

U.S. PATENT DOCUMENTS

| | | | |
|---|---|---|---|
| 2013/0226447 A1* | 8/2013 | Mizuno | G01C 21/26 701/409 |
| 2016/0305814 A1 | 10/2016 | Pita-Gil | |
| 2019/0227547 A1* | 7/2019 | Sugahara | B60W 50/0098 |
| 2019/0369635 A1* | 12/2019 | Kobayashi | G05D 1/0246 |
| 2022/0024492 A1* | 1/2022 | Panttila | B60W 60/00182 |
| 2023/0041503 A1* | 2/2023 | Salter | E05F 15/75 |
| 2023/0410528 A1* | 12/2023 | Weston | B60G 17/0182 |
| 2024/0020868 A1* | 1/2024 | Lee | G06V 20/56 |
| 2024/0046605 A1* | 2/2024 | Capellier | G01S 17/931 |

FOREIGN PATENT DOCUMENTS

| | | | | |
|---|---|---|---|---|
| DE | 102023119679 A1 | 6/2024 | | |
| EP | 3137859 B1 | 9/2020 | | |
| KR | 20230057524 A | * | 5/2023 | ............ G01G 23/01 |

* cited by examiner

*Primary Examiner* — Krishnan Ramesh
(74) *Attorney, Agent, or Firm* — Ingrassia Fisher & Lorenz, LLP | IF&L

(57) ABSTRACT

Methods and systems are provided for a vehicle towing a trailer. In one embodiment, a method includes: receiving, by a processor, image data from one or more image sensors of the vehicle; determining, by the processor, a change in vehicle height based on the image data; determining, by the processor, at least one of a vehicle load and a trailer tongue load based on the change in vehicle height; and generating, by the processor, at least one of notification data and control data to control the vehicle based on the at least one of the vehicle load and the trailer tongue load.

20 Claims, 5 Drawing Sheets

METHODS AND SYSTEMS FOR ESTIMATING VEHICLE LOAD AND TRAILER TONGUE LOAD BASED ON CAMERA IMAGES

INTRODUCTION

The technical field generally relates to vehicles and, more specifically, to methods and systems for determining vehicle load and trailer tongue load values associated with a trailer coupled to the vehicle and controlling the vehicle based on the determined values.

Trailer tongue load is a measure of the load the trailer tongue exerts on a tow hitch of a vehicle. Vehicle load is a measure of the payload on the vehicle. When either of the loads are too much, sub-optimal performance of the vehicle can be experienced. For example, trailer sway and/or vehicle instability can occur. Most vehicles are not equipped with sensors to directly sense the load values. Adding additional sensors to directly sense the load values increases the complexity of the vehicle.

Accordingly, it is desirable to provide methods and systems for determining load values associated with trailer tongue load and vehicle load without adding any additional load sensors. Furthermore, it is desirable to improve performance of the vehicle based on the determined load values. Furthermore, other desirable features and characteristics of the present invention will become apparent from the subsequent detailed description and the appended claims, taken in conjunction with the accompanying drawings and this background introduction.

SUMMARY

Methods and systems are provided for a vehicle configured to tow a trailer. In one embodiment, a method includes: receiving, by a processor, image data from one or more image sensors of the vehicle; determining, by the processor, a change in vehicle height based on the image data; determining, by the processor, at least one of a vehicle load and a trailer tongue load based on the change in vehicle height; and generating, by the processor, at least one of notification data and control data to control the vehicle based on the at least one of the vehicle load and the trailer tongue load.

In various embodiments, the method includes determining a front wheel or axle position and a rear wheel or axle position from the image data, and wherein the determining the change in vehicle height is based on the front wheel or axle position and the rear wheel or axle position.

In various embodiments, the method includes evaluating a velocity of the vehicle; and enabling the determining of the change in the vehicle height based on the evaluating.

In various embodiments, the method includes evaluating a health of the image sensor; and enabling the determining of the change in the vehicle height based on the evaluating.

In various embodiments, the method includes evaluating a visibility of a front wheel or axle position and a rear wheel or axle position from the image data; and enabling the determining of the change in the vehicle height based on the evaluating.

In various embodiments, the method includes determining whether a road grade angle can be determined, and when the road grade angle cannot be determined, the notification data includes overload information.

In various embodiments, the method includes determining a road grade angle from global positioning data, and scaling, by the processor, the at least one of the vehicle load and the trailer tongue load based on the road grade angle.

In various embodiments, the method includes determining a road grade angle from the image data, and scaling, by the processor, the at least one of the vehicle load and the trailer tongue load based on the road grade angle.

In various embodiments, the method includes determining a first pixel count between a first point and a second point in a first image of the image data where the vehicle is not loaded; determining a second pixel count between a third point and a fourth point in a second image of the image data where the vehicle is loaded, and converting the first and the second pixel count to a metric height, and wherein the determining the change in the vehicle height is based on the converted metric heights.

In various embodiments, the method includes the first point and the third point are associated with a body of the vehicle, and wherein the second point and the fourth point are associated with a tire or axle of the vehicle.

In another embodiment, a system includes: a non-transitory computer readable medium configured to store suspension parameters; and a computer system onboard the vehicle. The computer system is configured to: receive image data from one or more image sensors of the vehicle; determine a change in vehicle height based on the image data; determine at least one of a vehicle load and a trailer tongue load based on the change in vehicle height; and generate at least one of notification data and control data to control the vehicle based on the at least one of the vehicle load and the trailer tongue load.

In various embodiments, the computer system is further configured to determine a front wheel or axle position and a rear wheel or axle position from the image data, and wherein determine the change in vehicle height based on the front wheel or axle position and the rear wheel or axle position.

In various embodiments, the computer system is further configured to evaluate a velocity of the vehicle; and enable the determining of the change in the vehicle height based on the evaluating.

In various embodiments, the computer system is further configured to evaluate a health of the image sensor; and enable the determining of the change in the vehicle height based on the evaluating.

In various embodiments, the computer system is further configured to evaluate a visibility of a front wheel or axle position and the rear wheel or axle position from the image data; and enable the determining of the change in the vehicle height based on the evaluating.

In various embodiments, the computer system is further configured to determine whether a road grade angle can be determined, and when the road grade angle cannot be determined, the notification data includes overload information.

In various embodiments, the computer system is further configured to determine a road grade angle from at least one of the image data and global positioning data, and scale the at least one of the vehicle load and the trailer tongue load based on the road grade angle.

In various embodiments, the computer system is further configured to determine a first pixel count between a first point and a second point in a first image of the image data where the vehicle is not loaded; determine a second pixel count between a third point and a fourth point in a second image of the image data where the vehicle is loaded, and convert the first and the second pixel count to a metric height, and determine the change in the vehicle height based on the converted metric heights.

In various embodiments, the first point and the third point are associated with a body of the vehicle, and wherein the second point and the fourth point are associated with a tire or axle of the vehicle.

In another embodiment, a vehicle includes: at least one camera configured to capture a side view of the vehicle; and a computer system configured to, by a processor: receive image data from one or more image sensors of the vehicle; determine a change in vehicle height based on the image data; determine at least one of a vehicle load and a trailer tongue load based on the change in vehicle height; and generate at least one of notification data and control data to control the vehicle based on the at least one of the vehicle load and the trailer tongue load.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
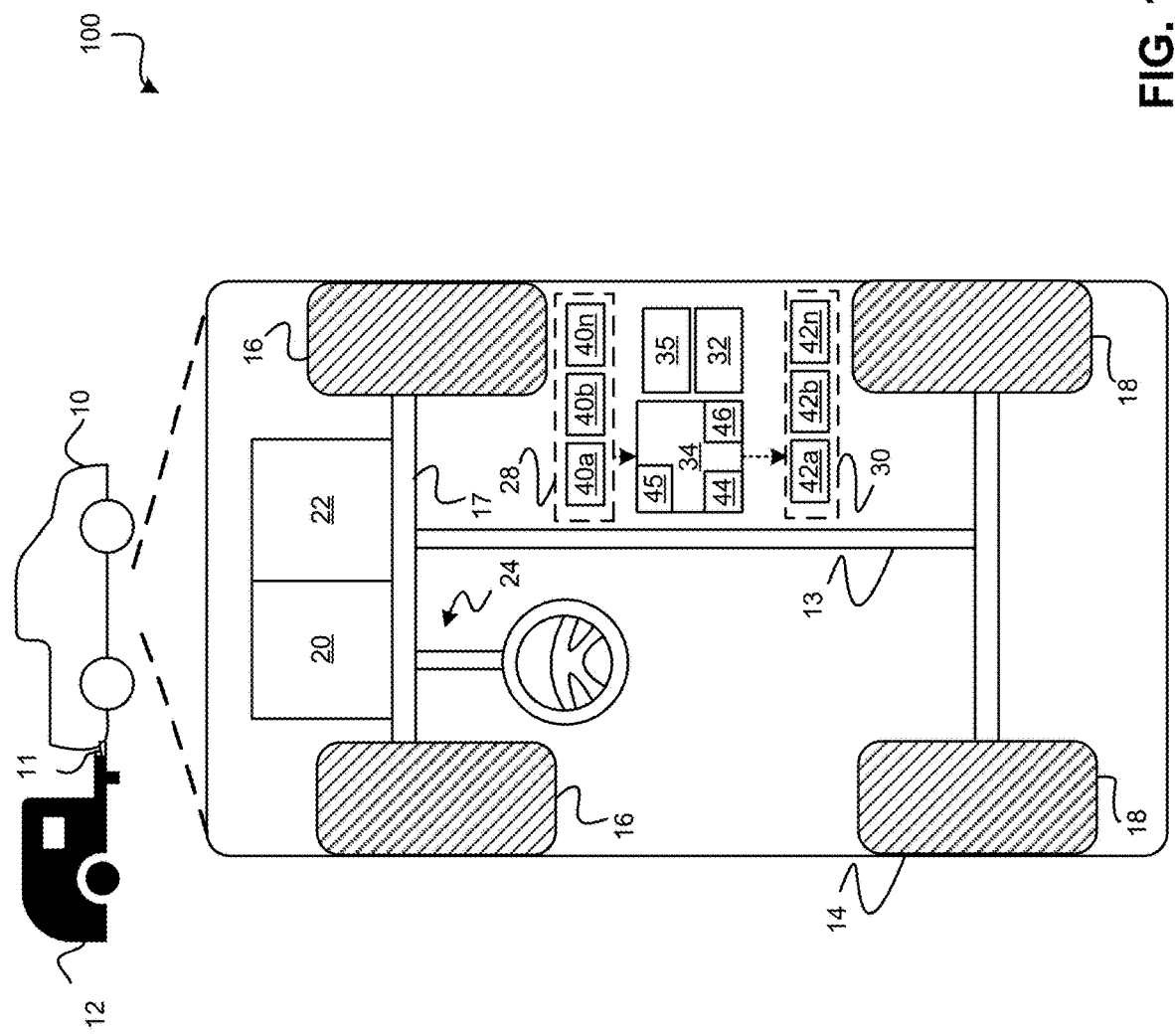
FIG. 1 is a functional block diagram of a vehicle that includes a load value determination system, in accordance with various embodiments.

With reference to FIG. 1, a load value determination system shown generally at 100 is associated with a vehicle 10 in accordance with various embodiments. Generally, the load value determination system 100 estimates load values, such as vehicle load and/or trailer tongue load while the vehicle 10 is towing a trailer 12. As will be discussed in more detail below, the load value determination system 100 determines the values based on an analysis of image data provided by a camera that captures sideview images of the vehicle 10.

As shown in FIG. 1, the vehicle 10 comprises an automobile configured to tow the trailer 12. The vehicle 10 may be any one of a number of different types of automobiles, such as, for example, a sedan, a wagon, a truck (as shown), or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile. In various embodiments, the trailer 12 may be any type of towable application having one or more wheels and is not limited to any one embodiment.

The vehicle 10 is configured to couple to and connect to the trailer 12 via a connection apparatus 11 and is configured to tow the trailer 12. In various embodiments, the connection apparatus 11 comprises a hitch mechanism comprising a ball that couples to a tongue of the trailer 12. When coupled to the vehicle 10, the tongue applies a load to the hitch mechanism and thus, the vehicle 10. This load imparted on the trailer tongue is referred to as the trailer tongue load. The load imparted on the vehicle 10 by the trailer 12 and other payload within the vehicle 10 is referred to as the vehicle load.

As depicted in FIG. 1, the exemplary vehicle 10 generally includes a chassis 13, a body 14, front wheels 16, rear wheels 18, and a suspension system 19. The body 14 is arranged on the chassis 13 and substantially encloses components of the vehicle 10. The body 14 and the chassis 13 may jointly form a frame. The wheels 16-18 are each rotationally coupled to the chassis 13 through axles 17 (front and rear) of the suspension system 19 near a respective corner of the body 14. In various embodiments, the wheels 16-18 include tires coupled to rims.

The vehicle 10 further includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle 10 and/or of the components of the vehicle 10 itself. The sensing devices 40a-40n can include, but are not limited to, radars, lidars, global positioning systems, optical cameras, thermal cameras, ultrasonic sensors, inertial measurement units, pressure sensors, position sensors, displacement sensors, speed sensors, and/or other sensors. In various embodiments, one or more of the sensing devices 40a-40n include one or more side-view cameras configured to capture a side-view image of the vehicle 10. In various embodiments, the side-view camera is integrated within the vehicle 10, for example as part of a side-view mirror. In various other embodiments, the side-view camera is an auxiliary camera (i.e., configured on a remote vehicle 10 or remote device such as a user device) that communicates data associated with the captured images to the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for performing the load value determination and controlling the vehicle 10. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the load value determination system 100 and, when executed by the processor 44, receive data from the sensor system 28 and process the received data in order to extract points identifying deflections of the vehicle 10. The instructions use the extracted points to estimate trailer tongue load and vehicle load. The instructions further process the sensor data to determine a road grade angle and adjust the estimates of the trailer tongue load and the vehicle load based on the road grade angle, if available. The instructions are further configured to control the vehicle 10 based on the determined load values.

As can be appreciated, the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
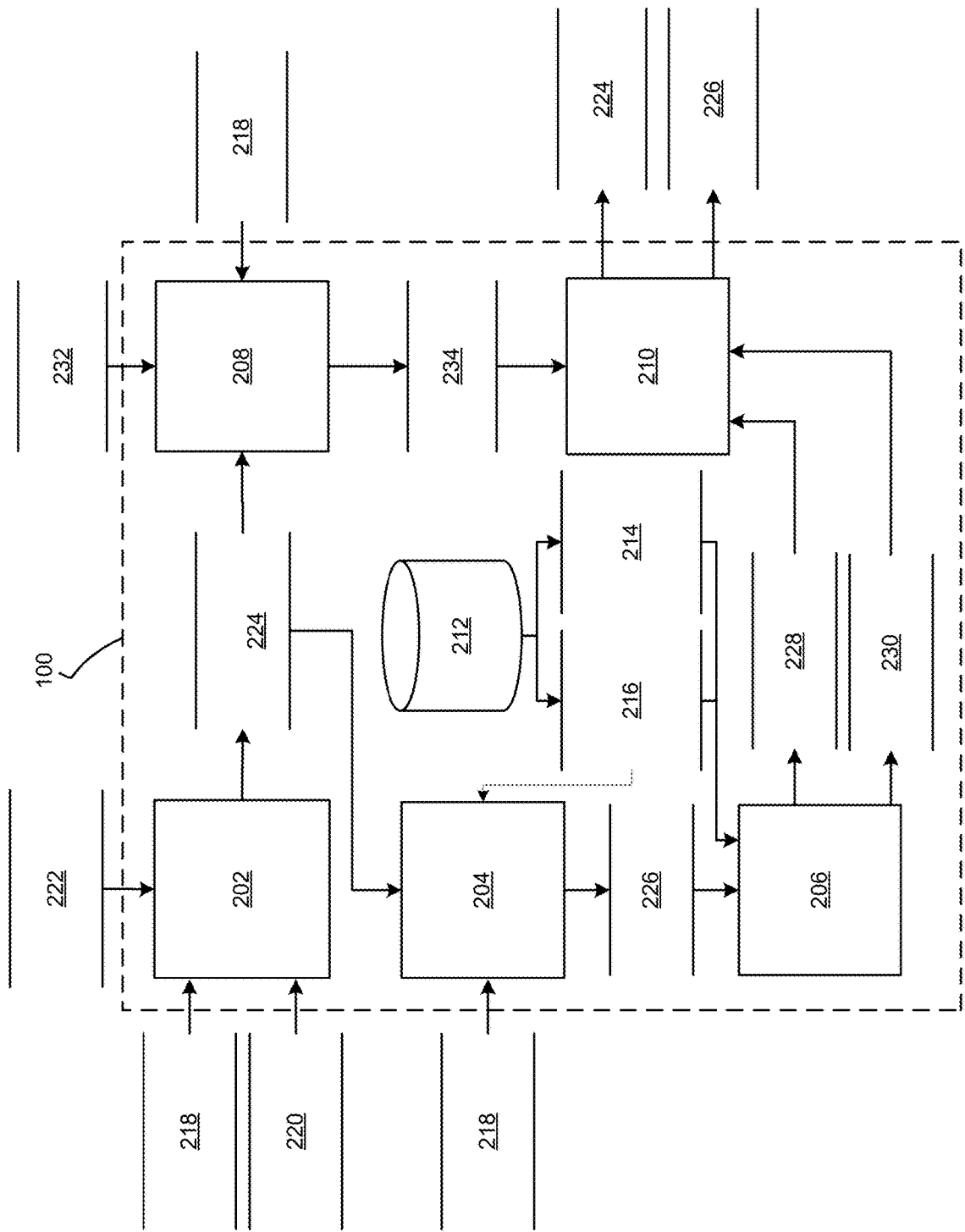
FIG. 2 is a dataflow diagram illustrating elements of the load value determination system of the vehicle of FIG. 1, in accordance with various embodiments.

With reference to FIG. 2 and with continued reference to FIG. 1, a dataflow diagram illustrates elements of the load value determination system 100 of FIG. 1 in accordance with various embodiments. As can be appreciated, various embodiments of the load value determination system 100 according to the present disclosure may include any number of modules embedded within the controller 34 which may be combined and/or further partitioned to similarly implement systems and methods described herein. Furthermore, inputs to the load value determination system 100 may be received from the sensor system 28, received from other control modules (not shown) associated with the vehicle 10 and/or the trailer 12, and/or determined/modeled by other sub-modules (not shown) within the controller 34 of FIG. 1. In various embodiments, the load value determination system 100 includes an enablement module 202, a vehicle height determination module 204, a load determination module 206, a road grade angle determination module 208, a notification module 210, and a parameter datastore 212.

The parameter datastore 212 stores suspension parameters 214, and vehicle and/or camera parameters 216 used in determining the load values as will be discussed in more detail below. As can be appreciated, the parameters can be predefined during manufacture and/or be set based on user input provided by a user configuring the system 100.

In various embodiments, the enablement module 202 receives as input image data 218, sensor health data 220, and vehicle speed data 222. In various embodiments, the image data 218 includes a left side-view image and/or a right side-view image of the vehicle 10 taken from the camera (either integrated within the vehicle 10 or as a separate camera) that is configured to capture side-view images of the vehicle 10. The enablement module 202 evaluates the received data 218-222 based on defined enablement conditions to enable or disable the load value determination. For example, the enablement module 202 sets enablement data 224 to a value indicating enabled or disabled based on the evaluation.

For example, the enablement module 202 evaluates the image data 218 to determine if both axles or wheels (front and back), or if one axle or wheel (front or back) and one partial wheel are visible in the image. When both axles or wheels or one axle or wheel and one partial wheel are visible in the image, the enablement module 202 sets the enablement data 224 to indicate enabled. When both axles or wheels are not present in the image, or a partial wheel is not present in the image, the enablement module 202 sets the enablement data 224 to indicate disabled.

In another example, the enablement module 202 evaluates the vehicle speed data 222 to determine whether the vehicle 10 is stationary. When the vehicle 10 is stationary, the enablement module 202 sets the enablement data 224 to indicate enabled. When the vehicle 10 is not stationary, the enablement module 202 sets the enablement data 224 to indicate disabled.

In another example, the enablement module 202 evaluates the sensor health data 220 to determine if the sensing device such as the camera is healthy. When the camera is healthy, the enablement module 202 sets the enablement data 224 to indicate enabled. When the camera is not healthy, the enablement module 202 sets the enablement data 224 to indicate disabled.

As can be appreciated, any combination of the described enablement conditions may be used to enable the load value determination, in various embodiments, as the disclosure is not limited to the present examples.

The vehicle height determination module 204 receives as input the enablement data 224, the image data 218, and the vehicle/camera parameter data 216. When the enablement data 224 indicates that the feature is enabled, the vehicle height determination module 204 processes the image data 218 to determine and analyze a frame height of the vehicle 10. For example, the vehicle height determination module 204 pre-processes the image data 218 to enhance the contrast of the image, for example, using a histogram stretch method or some other method and then performs an edge detection on the enhanced image data to produce edge data indicating the edges of the detected objects within the image.

From the edge data, the vehicle height determination module 204 extracts points from the defined edges in the image and uses the points to compute a vehicle height. In various embodiments, the vehicle height determination module 204 extracts points associated with the vehicle body by comparing the image to a template image defining the edge of the body. For example, the vehicle height determination module 204 identifies a top center point of each wheel well associated with the wheels 16-18 or other body component using the comparison, and extracts the associated points from the image.

In another example, when the enablement data 224 indicates that both axles or wheels are visible, the vehicle height determination module 204 extracts points associated with a center of each wheel (e.g., the point associated with the axle) by fitting an ellipse-shaped element to elements in the image to identify the wheels or rims. Once the wheels or rims are identified, the vehicle height determination module 204 identifies the centers of the fitted ellipse-shaped elements as the center of the wheel and extracts the associated points in the image.

In another example, when the enablement data 224 indicates that one or more of the axles or wheels is not entirely visible, the vehicle height determination module 204 extracts points associated with a location where the tire meets the ground by identifying a line of a certain predefined width in a certain area of the image where the tire would be expected to be visible.

The vehicle height determination module 204 then computes a vehicle height by determining difference between a position of the extracted vehicle body point and the tire center point or the tire ground point for both the front wheel and the rear wheel and generates vehicle height data 226 based thereon. For example, in various embodiments, the difference can be computed based on a count of the number of pixels between the identified points in the image, and a conversion of the count to the lengths L1 and L2.

Figure 3:
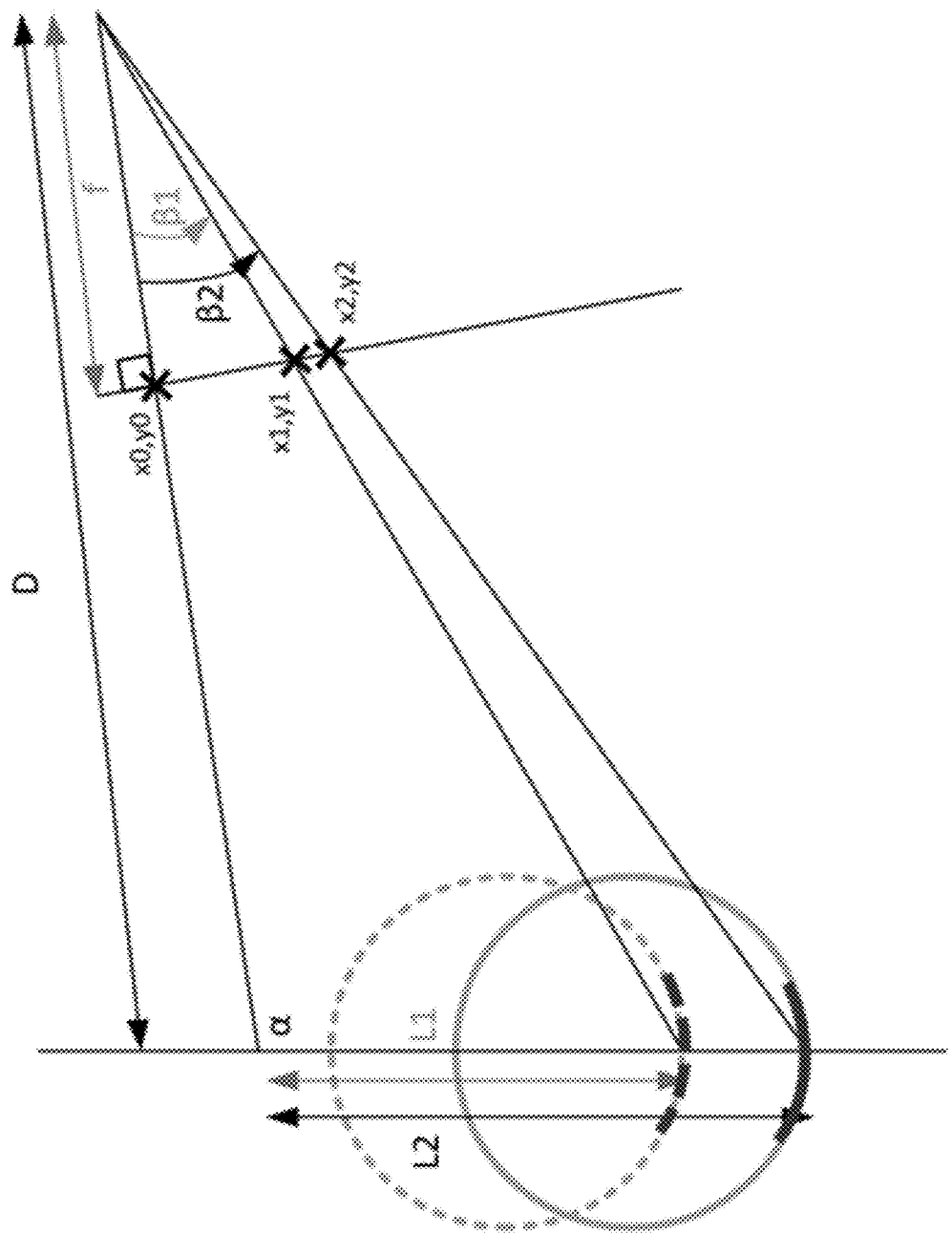
FIGS. 3 and 4 are illustrations of computed parameters by the load value determination system.

As shown in FIG. 3, the following relationships can be used to compute the vehicle height at the front wheel and the rear wheel:

$$\beta_1 = \sin\left(\frac{\sqrt{(x_1 - x_0)^2 + (y_1 - y_0)^2}}{f}\right),$$

$$\beta_2 = \sin\left(\frac{\sqrt{(x_2 - x_0)^2 + (y_2 - y_0)^2}}{f}\right),$$

$$L_1 = D\frac{\sin(\beta_1)}{\sin(180 - \beta_1 - \alpha)},$$

$$L_2 = D \frac{\sin(\beta_2)}{\sin(180 - \beta_2 - \alpha)},$$

and $$\Delta L = L_2 - L_1$$

Where f represents the focal length of the camera, $x_0$, $y_0$ represent the location of the extracted frame point in the image space, $x_1$, $y_1$ represents observations in the image space of the tire (the center axle or where the tire meets the road) at time t1, and $x_2$ $y_2$ represents observations in the image space of the tire at time t2. Where $\alpha$ represents the intersection angle in object space of the camera's focal ray with the vertical line through the vehicle's axle point (along which the vehicle moves up and down), as computed from camera extrinsic parameters and vehicle dimensions, D represents the three-dimensional distance in object space between the camera location and the vertical line through the vehicle's axle point (along which the vehicle moves up and down), as computed from camera extrinsic parameters and vehicle dimensions, $\beta_1$ represents the angle between the principal ran and the image ray to tire point in image space at time t1, $\beta_1$ represents the angle between the principal ray and the image ray to where the tire point in image space at time t2. And where $L_1$ represents the vehicle height in object space at time t1 (e.g., a default height when the vehicle is unloaded), $L_2$ represents the vehicle height in object space at time t1, and $\Delta L$ represents the change in vehicle height in object space between time t1 and t2.

With reference back to FIG. 2, in various embodiments, the load determination module 206 receives as input the vehicle height data 226, the suspension parameter data 214, and the vehicle and/or camera parameter data 216. The load determination module 206 converts the vehicle height data 226 into force values based on the suspension parameter data 214. For example, a calibration, lookup table, or real-time function can be used to estimate the force values, where the values are defined based on characteristics of the suspension system, derived through data collection, or computed/estimated through simulation.

Figure 4:
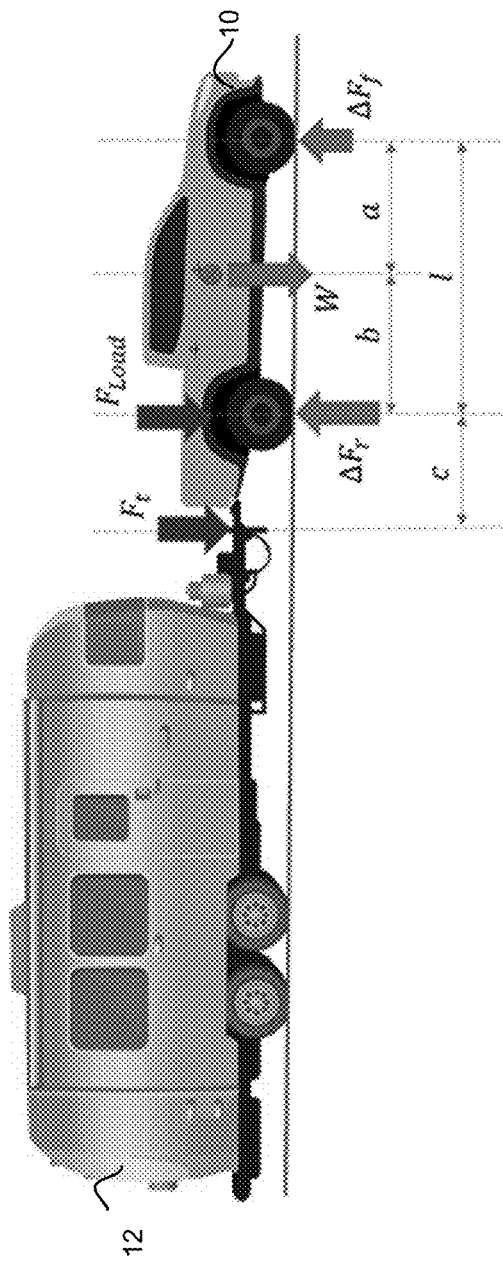

Thereafter, the load determination module 206 determines the vehicle load and the trailer tongue load based on the force values and the vehicle parameter data 216 and generates vehicle load data 228 and trailer tongue load data 230 based thereon. As shown in FIG. 4, the following relationships can be used to determine the load values:

$$F_t = -\frac{l}{c}\Delta F_f,$$

and $$F_{load} = \Delta F_r + \Delta F_f\left(1 + \frac{l}{c}\right).$$

where $F_t$ represents the load on the trailer tongue, $F_f$ represents the load on the load on the front axle, $F_r$ represents the load on the rear axle, $F_{load}$ represents the load on the vehicle, l represents the distance between the front axle and the rear axle of the vehicle 10, and c represents the distance between the rear axle and the trailer tongue when coupled to the hitch.

As can be appreciated, in various embodiments, the load values can be determined for each of the left side of the vehicle 10 (i.e. the driver side) and the right side (i.e., the passenger side) of the vehicle 10 depending on the images received With reference back to FIG. 2, in various embodiments, the road grade angle determination module 208 receives as input GPS data 232, and/or the image data 218. The road grade angle determination module 208 determines the road grade angle from the GPS data 232 and/or the image data 218 and generates road grade angle data 234 data based thereon. For example, when GPS data 232 is available the road grade angle is obtained from the last recorded differential in positioning (e.g., from a global navigation satellite system GNSS).

In various embodiments, when the GPS data 232 is not available, the image data 218 is processed for external line features. For example, the direction of vertical lines and optionally horizontal lines are extracted from buildings, polls, road signs, etc. The road grade angle determination module 208 determines the road angle grade from the vector intersection of the extracted lines. As can be appreciated, a combination of the GPS data 232 and the image data 218 may be used to determine the road grade angle using a combination of these methods or other methods in various embodiments as the disclosure is not limited to the present example.

In various embodiments, the notification module 210 receives as input the road grade angle data 234, the vehicle load data 228, and the trailer tongue load data 230. The notification module 210 evaluates the data and generates notification data 236 and/or control data 238 based thereon. For example, when the road grade angle data 234 is available, notification data 236 is generated that includes the actual increase or value of the vehicle load and the trailer tongue load. When the vehicle load or the trailer tongue load is greater than a maximum load, notification data 236 is generated to indicate an overload condition. In another example, when the road grade angle data 234 is not available and the vehicle load is greater than a maximum load, notification data 236 is generated to indicate an overload condition.

In various embodiments, the trailer tongue load data 230, the vehicle load data 228, and/or any overload conditions may also be provided as the control data 238 to the control system or other vehicle systems for use in automated control of the vehicle 10 and/or for display purposes. For example, the load values can be provided as a load value in newtons, a percent load of a maximum load, or as an image or display affect representing the load value and/or percent.

Figure 5:
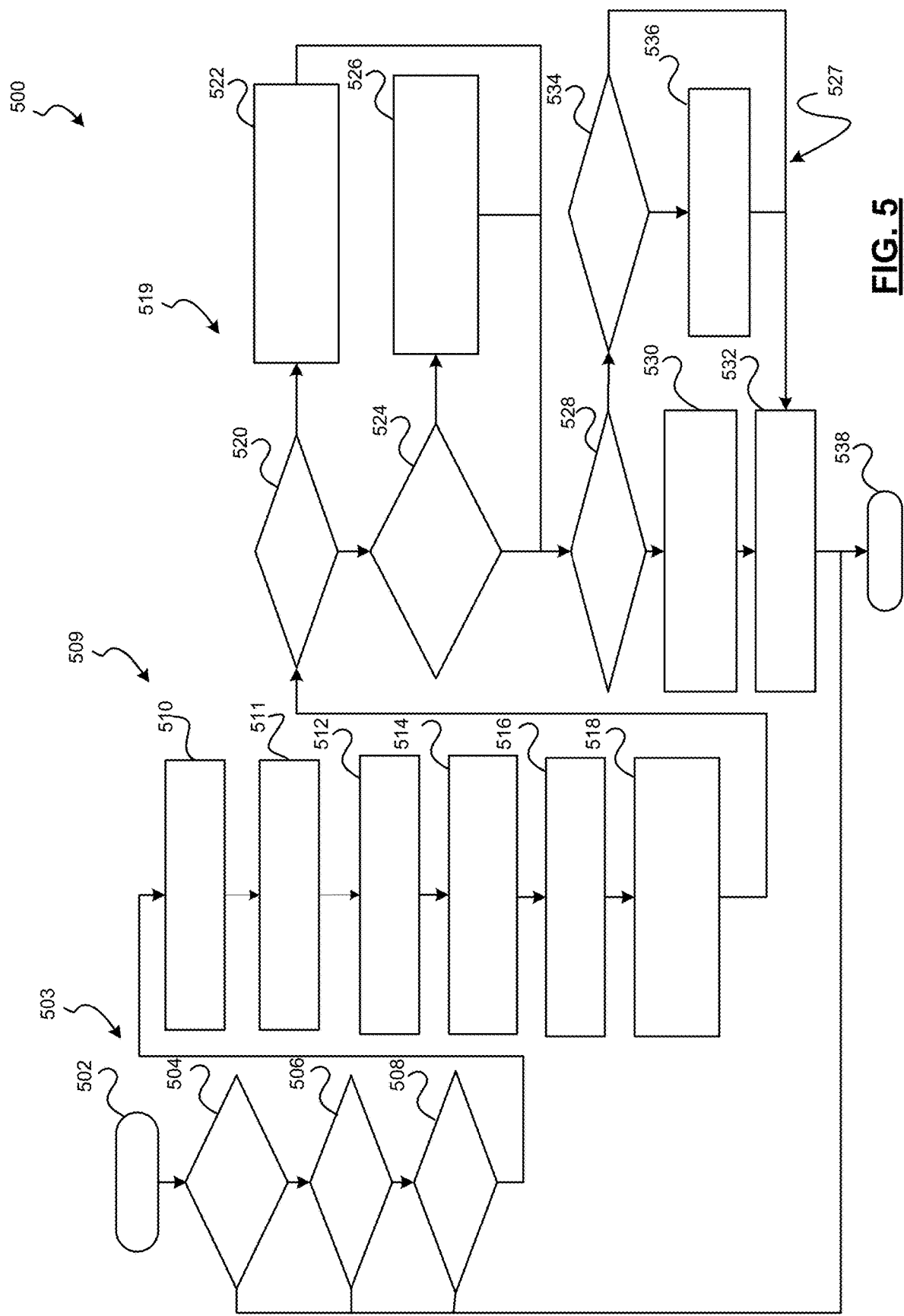
FIG. 5 is a flowchart illustrating a process for determining load values as performed by the load value determination system of the vehicle of FIGS. 1 and 2, in accordance with exemplary embodiments.

With reference now to FIG. 5 and with continued reference to FIGS. 1-2 a flowchart provides a method 500 for determining load values and controlling a vehicle 10 based thereon, in accordance with exemplary embodiments. As can be appreciated in light of the disclosure, the order of operation within the method 500 is not limited to the sequential execution as illustrated in FIG. 5 but may be performed in one or more varying orders as applicable and in accordance with the present disclosure. In various embodiments, the method 500 can be scheduled to run based on one or more predetermined events, and/or can run continuously during operation of the vehicle 10.

In one example, the method 500 may begin at 502. The enablement conditions are evaluated at 503. For example, the image data is evaluated to determine if both axles and/or wheels (front and back) are at least partially visible in the image at 504. When both axles and/or wheels are not at least partially present in the image at 504, the feature is disabled and the method 500 may end at 538. When both axles and/or wheels are at least partially visible in the image at 504, the vehicle speed data is evaluated to determine whether the vehicle 10 is stationary at 506. When the vehicle 10 is not stationary at 506, the feature is disabled and the method 500 may end at 538.

When the vehicle 10 is stationary at 506, the camera health data is evaluated to determine if the camera is healthy at 508. When the camera is not healthy at 508, the feature is disabled and the method 500 may end at 538. When the camera is healthy at 508, the method 500 proceeds to processing the image data to determine the load values at 509.

For example, the image data is pre-processed at 510 to determine the edge data. From the edge data, the points are extracted at 511 and the vehicle frame height at the front wheel and/or the rear wheel is computed based on a pixel count at 512. The vehicle frame heights are then used to determine a change in height at each wheel from a default height at 514. The force on the front wheel and the force on the rear wheel are determined based on the change in heights respectively at 516, and the vehicle load and the trailer tongue load are determined based on the front axle force and the rear axle force and the vehicle parameters at 518.

Thereafter, it is determined whether the road grade angle affects the load determination at 519. For example, it is determined whether GPS is available at 520, when GPS data is available at 520, the road grade angle is obtained from the last recorded differential in GNSS at 522. When GPS data is not available at 520, it is determined whether the image data can be processed for external line features at 524. When line features can be extracted at 524, the direction of vertical lines and optionally horizontal lines are extracted from buildings, polls, road signs, etc. at 526 and the road angle grade is determined from the vector intersection of the extracted lines.

Thereafter, the notification data and/or control data is generated at 527 based on whether the road grade angle has been detected. For example, when the road angle data is available at 528, the load values are adjusted for the road grade angle at 530, and notification data is generated that includes the actual increase or value of the vehicle load and the trailer tongue load at 532. Thereafter, the method 500 may end at 538.

In another example, when the road angle data is not available at 528 and the vehicle load is greater than a max load at 534, notification data is generated to indicate an overload condition at 536. Thereafter, the method 500 may end at 538. As can be appreciated, while the flow is not shown, the overload condition can also be generated regardless of the when the road angle data is available in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for a vehicle configured to tow a trailer, comprising:
   receiving, by a processor, image data from one or more image sensors of the vehicle;
   determining, by the processor, a change in vehicle height based on the image data;
   determining, by the processor, at least one of a vehicle load and a trailer tongue load based on the change in vehicle height;
   determining a road grade angle from global positioning data, and scaling, by the processor, the at least one of the vehicle load and the trailer tongue load based on the road grade angle;
   generating, by the processor, control data to control the vehicle based on the at least one of the vehicle load and the trailer tongue load; and
   automatically controlling the vehicle, via the processor, based on the control data, using the at least one of the vehicle load and the trailer tongue load.

2. The method of claim 1, further comprising determining, by the processor, a front wheel or axle position and a rear wheel or axle position from the image data, and wherein the determining the change in vehicle height is based on the front wheel or axle position and the rear wheel or axle position.

3. The method of claim 1, further comprising evaluating a velocity of the vehicle; and enabling the determining of the change in the vehicle height based on the evaluating.

4. The method of claim 1, further comprising evaluating a health of the one or more image sensors; and enabling the determining of the change in the vehicle height based on the evaluating.

5. The method of claim 1, further comprising evaluating a visibility of a front wheel or axle position and a rear wheel or axle position from the image data; and enabling the determining of the change in the vehicle height based on the evaluating.

6. The method of claim 1, further comprising determining whether a road grade angle can be determined, and when the road grade angle cannot be determined, the notification data includes overload information.

7. The method of claim 1, further comprising determining the road grade angle also from the image data.

8. The method of claim 1, further comprising determining a first pixel count between a first point and a second point in a first image of the image data where the vehicle is not loaded; determining a second pixel count between a third point and a fourth point in a second image of the image data where the vehicle is loaded, and converting the first and the second pixel count to a metric height, and wherein the determining the change in the vehicle height is based on the converted metric heights; wherein the first point and the third point are associated with a body of the vehicle, and wherein the second point and the fourth point are associated with a tire or axle of the vehicle.

9. The method of claim 1, further comprising:
   scaling, by the processor, both the vehicle load and the trailer tongue load based on the road grade angle;
   generating, by the processor, the control data based on both the vehicle load and the trailer tongue load; and
   automatically controlling movement of the vehicle, via the processor, based on the control data, using both the vehicle load and the trailer tongue load.

10. A system for a vehicle configured to tow a trailer, comprising:
- a non-transitory computer readable medium configured to store suspension parameters; and
- a computer system onboard the vehicle and configured to, by a processor:
  - receive image data from one or more image sensors of the vehicle;
  - determine a change in vehicle height based on the image data;
  - determine at least one of a vehicle load and a trailer tongue load based on the change in vehicle height;
  - determine a road grade angle from at least one of the image data and global positioning data, and scale the at least one of the vehicle load and the trailer tongue load based on the road grade angle;
  - generate control data to control the vehicle based on the at least one of the vehicle load and the trailer tongue load; and
  - automatically control the vehicle based on the control data, using the at least one of the vehicle load and the trailer tongue load.

11. The system of claim 10, wherein the computer system is further configured to determine a front wheel or axle position and a rear wheel or axle position from the image data, and wherein determine the change in vehicle height based on the front wheel or axle position and the rear wheel or axle position.

12. The system of claim 10, wherein the computer system is further configured to evaluate a velocity of the vehicle; and enable the determining of the change in the vehicle height based on the evaluating.

13. The system of claim 10, wherein the computer system is further configured to evaluate a health of the one or more image sensors; and enable the determining of the change in the vehicle height based on the evaluating.

14. The system of claim 10, wherein the computer system is further configured to evaluate a visibility of a front wheel or axle position and a rear wheel or axle position from the image data; and enable the determining of the change in the vehicle height based on the evaluating.

15. The system of claim 10, wherein the computer system is further configured to determine whether a road grade angle can be determined, and when the road grade angle cannot be determined, the notification data includes overload information.

16. The system of claim 10, wherein the computer system is further configured to determine a first pixel count between a first point and a second point in a first image of the image data where the vehicle is not loaded; determine a second pixel count between a third point and a fourth point in a second image of the image data where the vehicle is loaded, and convert the first and the second pixel count to a metric height, and determine the change in the vehicle height based on the converted metric heights; and wherein the first point and the third point are associated with a body of the vehicle, and wherein the second point and the fourth point are associated with a tire or axle of the vehicle.

17. The system of claim 10, wherein the computer system is further configured, via the processor, to:
- determine the road grade angle from both the image data and the global positioning data, and scale both the vehicle load and the trailer tongue load based on the road grade angle;
- generate the control data based on both the vehicle load and the trailer tongue load; and
- automatically control movement of the vehicle based on the control data, using both the vehicle load and the trailer tongue load.

18. A vehicle, comprising:
- at least one camera configured to capture a side view of the vehicle; and
- a computer system configured to, by a processor:
  - receive image data from one or more image sensors of the vehicle;
  - determine a change in vehicle height based on the image data;
  - determine at least one of a vehicle load and a trailer tongue load based on the change in vehicle height;
  - determine a road grade angle from at least one of the image data and global positioning data, and scale the at least one of the vehicle load and the trailer tongue load based on the road grade angle;
  - generate control data to control the vehicle based on the at least one of the vehicle load and the trailer tongue load; and
  - automatically control the vehicle based on the control data, using the at least one of the vehicle load and the trailer tongue load.

19. The vehicle of claim 18, wherein the computer system is further configured, via the processor, to:
- determine the road grade angle from both the image data and the global positioning data, and scale both the vehicle load and the trailer tongue load based on the road grade angle;
- generate the control data based on both the vehicle load and the trailer tongue load; and
- automatically control the vehicle based on the control data, using both the vehicle load and the trailer tongue load.

20. The vehicle of claim 19, wherein the computer system is further configured, via the processor, to automatically control movement of the vehicle based on the control data, using both the vehicle load and the trailer tongue load.

* * * * *